United States Patent [19]

Leong

[11] 4,381,063
[45] Apr. 26, 1983

[54] WEATHERPROOF COVER ASSEMBLY FOR ELECTRICAL WIRING DEVICES

[75] Inventor: Henry Leong, Kendall Park, N.J.

[73] Assignee: GTE Products Corporation, Stamford, Conn.

[21] Appl. No.: 352,487

[22] Filed: Feb. 25, 1982

Related U.S. Application Data

[63] Continuation of Ser. No. 241,795, Mar. 9, 1981, abandoned.

[51] Int. Cl.³ .............................................. H02G 3/14
[52] U.S. Cl. .................................... 220/242; 220/342; 220/3.8; 174/67; 339/44 M
[58] Field of Search ................. 220/241, 242, 342, 3.8; 174/67; 339/44 R, 44 M

[56] References Cited

U.S. PATENT DOCUMENTS

| | | | |
|---|---|---|---|
| 2,371,557 | 3/1945 | Sullivan | 220/242 |
| 3,137,407 | 6/1964 | MacKiewicz | 220/242 |
| 3,140,344 | 2/1962 | Slater et al. | 174/67 |
| 4,058,358 | 11/1977 | Carlisle | 339/44 M |
| 4,102,466 | 7/1978 | Jadatz | 220/3.8 |
| 4,197,959 | 4/1980 | Kramer | 220/242 |

Primary Examiner—George T. Hall
Attorney, Agent, or Firm—J. Stephen Yeo; William R. McClellan

[57] ABSTRACT

A weatherproof cover assembly includes a housing and a pivotally attached cover in a configuration in which no gasket is required between the cover and the housing. The housing includes a base having an aperture therethrough, an outer wall and an inner wall. The cover includes a flange which is located between the inner and outer walls when the cover is closed. The cover, the inner and outer walls, and the flange together inhibit entry of liquids into the assembly. A hinge construction for pivotal attachment of the cover to the housing includes a cylindrical opening in the cover and a pivot insert attached to the housing. A cylindrical torsion spring, having end loops on a diameter thereof, is retained in the hinge by slotted posts in the cylindrical opening and on the pivot insert. The cover pivots about sleeve portions of the pivot insert.

26 Claims, 14 Drawing Figures

WEATHERPROOF COVER ASSEMBLY FOR ELECTRICAL WIRING DEVICES

This is a continuation of application Ser. No. 06/241,795, filed Mar. 9, 1981, now abandoned.

CROSS REFERENCE TO RELATED APPLICATION

The present application is related to Leong, design for "Weatherproof Cover Assembly", Ser. No. 241798, filed concurrently with the present application and assigned to the same assignee as the present application.

BACKGROUND OF THE INVENTION

This invention relates generally to electrical wiring devices and, more particularly, to a weatherproof cover assembly for electrical receptacles, switches and the like.

Electrical wiring devices are frequently mounted in locations, such as the exterior wall of a residential home, which are exposed to the weather. It is necessary to protect the electrically conductive portions of these devices against the entry of moisture and airborne contaminants, such as dust. Moisture can originate from rain, fog, and other weather conditions or from man-made sources, such as lawn sprinklers. Weatherproof covers have long been in use to provide such protection. Typically, weatherproof covers include a base which is mounted over the electrical wiring device and a hinged cover which can be opened to provide access to the wiring device. Resilient gaskets provide seals between the cover and the base and between the base and the exterior wall.

While prior art weatherproof covers function in a generally satisfactory manner, they typically include a relatively large number of individual parts and are expensive to manufacture. It is therefore, an object of the present invention to provide a weatherproof cover assembly which not only provides effective protection for the electrical wiring device against entry of moisture and dust but also has a simple construction which is economical to manufacture.

SUMMARY OF THE INVENTION

According to the present invention, these and other objects and advantages are achieved in a weatherproof cover assembly for electrical wiring devices comprising a housing, cover means and means for pivotally attaching the cover means to the housing. The housing includes a base having at least one aperture therethrough for access to the wiring device, a plurality of interconnected outer walls and a plurality of interconnected inner walls. The outer walls extend frontwardly from the base and include a top outer wall and opposing side outer walls, each of the side outer walls having a front surface. The inner walls extend frontwardly from the base and have front surfaces. The inner walls and the base define a chamber. The cover means, which is pivotally attached to the side outer walls, encloses the chamber when the cover means is closed and provides access to the wiring device when the cover is open. The cover means includes a rear surface which bears against the front surfaces of the inner walls and against the front surfaces of the side outer walls when the cover means is closed, and a plurality of interconnected flanges extending rearwardly from the cover means. The flanges are disposed between the inner and outer walls when the cover means is closed. When the cover means is closed, the outer walls, the inner walls, the flanges and the cover means together inhibit entry of moisture and dust into the chamber with no requirement for a resilient gasket between the cover means and the housing. The cover means can be a single piece cover which encloses the chamber or can be two covers each of which encloses a portion of the chamber. The assembly can include means for locking the cover means in the closed position.

According to another aspect of the present invention, there is provided a spring loaded hinge construction for attachment of a cover to a housing so that the cover pivots about an axis of rotation. The hinge construction includes a hinge portion of the cover, a cylindrical torsion spring and a pivot insert having a base portion coupled to the housing. The hinge portion of the cover includes a cylindrical opening having a closed end and a first post which projects from the closed end of the opening and which has a slot therein. The cylindrical opening and the first post are coaxially aligned with the axis of rotation. The spring, with end loops on a diameter thereof, is coaxially aligned with the axis of rotation and is positioned in the cylindrical opening with the first post projecting into the spring so that one of the end loops of the spring is secured in the slot in the first post. The pivot insert includes a second post which projects from the base portion into the spring and which has a slot in which the other of the end loops of the spring is secured. The pivot insert further includes at least one sleeve portion which projects from the base portion into the cylindrical opening between the spring and an inner surface of the cylindrical opening. When the cover is opened or closed, the cover pivots about the sleeve portion and the spring urges the cover to a closed position.

For a better understanding of the present invention together with other and further objects, advantages and capabilities thereof reference is made to the following disclosure and appended claims in connection with the above described drawings.

DETAILED DESCRIPTION OF THE INVENTION

Figure 1A:
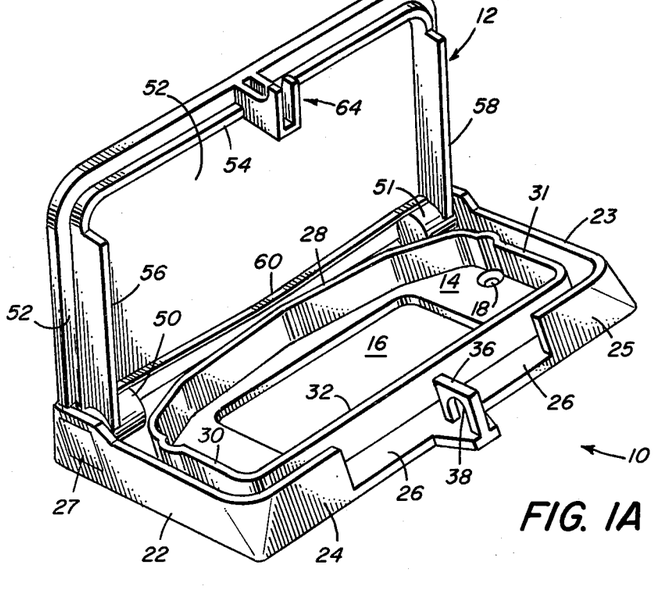
FIGS. 1A and 1B are perspective views of a single cover horizontal weatherproof cover assembly according to the present invention.
Figure 1B:
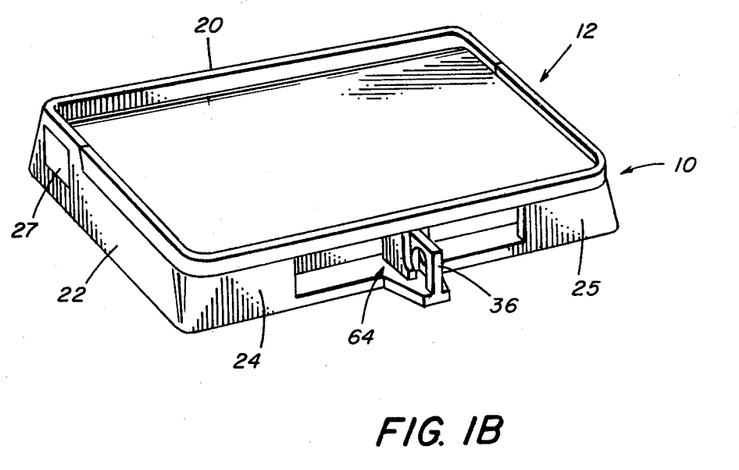

One example of a weatherproof cover assembly according to the present invention is shown in FIG. 1. The assembly includes a housing 10 and a cover 12 pivotally attached to the housing 10. The assembly typically covers an electrical receptacle or a switch mounted on a wall in a location which is exposed to the weather.

Figure 2:
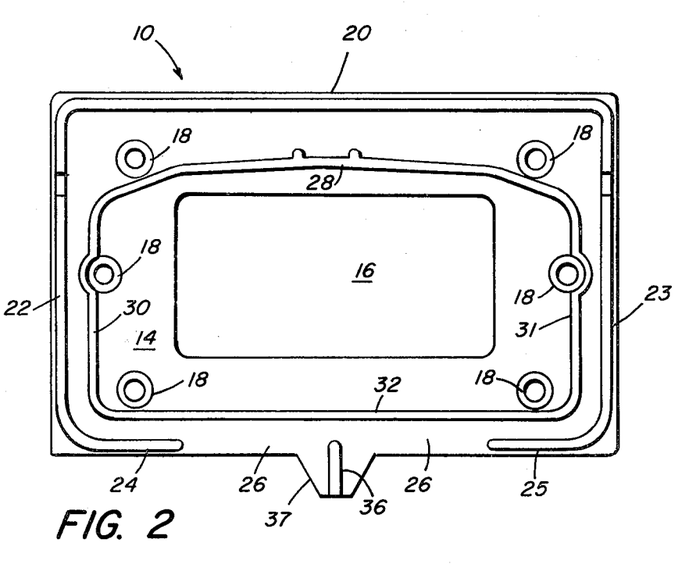
FIG. 2 is a front view of the housing of the weatherproof cover assembly shown in FIG. 1.
Figure 3:
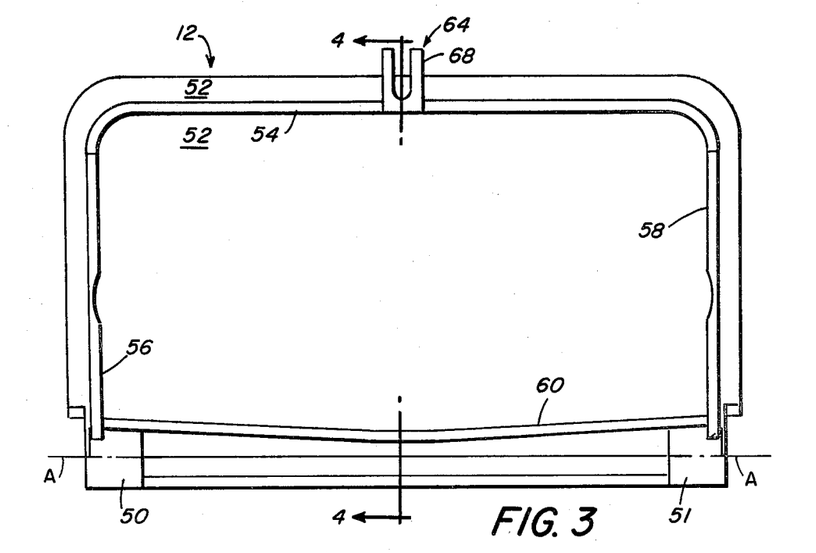
FIG. 3 is a rear view of the cover of the weatherproof cover assembly shown in FIG. 1.
Figure 4:
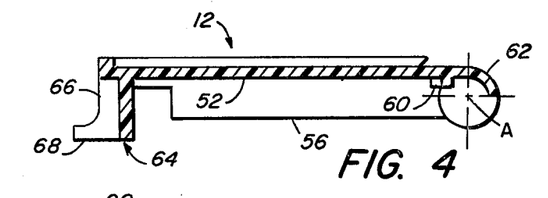
FIG. 4 is a cross-sectional view taken through the line 4—4 of the cover shown in FIG. 3.

The housing 10, which is shown in FIGS. 1A, 1B and 2, includes a base 14 provided with mounting holes 18. The base 14 has an aperture 16 therethrough for access to the electrical wiring device. A top outer wall 20, opposing side outer walls 22, 23, and bottom outer walls 24, 25 extend frontwardly from the base 14. When the weatherproof cover assembly is mounted over an electrical wiring device, the top outer wall 20 is at the top of the assembly. The outer walls 20, 22, 23, 24, 25 are interconnected to form a continuous outer wall around the base 14 except for a gap 26 between the bottom outer walls 24 and 25. Each side outer wall 22, 23 has a hole 27 for pivotal mounting of the cover 12. The top outer wall 20 extends from the base 14 by a greater distance than the side outer walls 22, 23 and bottom outer walls 24, 25 so as to overhang the upper edge of the cover 12, as best illustrated in FIG. 1B. A top inner wall 28, opposing side inner walls 30, 31, and a bottom inner wall 32 extend frontwardly from the base 14 and are interconnected to form a continuous inner wall. The aperture 16 is located inside the inner walls 28, 30, 31, 32. The top inner wall 28 is sloped downwardly from the center of the housing 10 toward the side outer walls 22, 23. A lug 36, which extends frontwardly from a downward projection 37 on the base 14 near the bottom thereof and has an opening 38 therethrough, is used for locking of the weatherproof cover assembly, as described hereinafter.

The cover 12, which is shown in FIGS. 1A, 1B, 3 and 4, is dimensioned to cover the base 14. When the cover 12 is closed, it covers the side outer walls 22, 23 and the bottom outer walls 24, 25 and is mounted below the top outer wall 20. The cover 12 includes hinge portions 50, 51 which are pivotally attached to the side outer walls 22, 23, respectively, as fully described hereinafter. The cover 12 pivots about an axis of rotation A through the hinge portions 50. The cover 12 has a generally flat rear surface 52. Flanges 54, 56, 58, 60, which extend rearwardly from the rear surface 52, are interconnected to form a continuous flange around the cover 12. When the cover 12 is closed, the flanges 54, 56, 58, 60 are located between the outer walls 20, 22, 23, 24, 25 and the inner walls 28, 30, 31, 32 of the housing 10. Also, when the cover 12 is closed, the rear surface 52 of the cover 12 bears against the front surfaces of the side outer walls 22, 23 and the bottom outer walls 24, 25 and against the front surfaces of the inner walls 28, 30, 31, 32. The upper edge 62 of the cover 12 is curved rearwardly. The cover 12 further includes a foot 64 used to lock the cover 12 in the closed position. The foot 64 includes a first portion 66 extending rearwardly from the cover 12 near the lower edge of the cover 12 and a second portion 68 extending downwardly from the first portion 66.

The weatherproof cover assembly shown in FIG. 1 provides access to the electrical wiring device when the cover 12 is opened and protects the wiring device against entry of moisture and dust when the cover 12 is closed. When the weatherproof cover assembly is installed, liquids can impact the assembly from above (rain) or from below (lawn sprinkler). The assembly is typically mounted to a wall surface over the wiring device with a resilient gasket material between the rear of the base 14 and the wall surface to prevent entry of moisture and dust behind the base 14. The cover assembly provides multiple barriers to the entry of moisture and dust. Thus, sealing gaskets between the cover 12 and the housing 10 are not required. When the cover 12 is closed against the housing 10, the cover 12 is a barrier against the entry of moisture and dust from the front. The outer walls 20, 22, 23, 24, 25, the flanges 54, 56, 58, 60 on the cover 12 and the inner walls 28, 30, 31, 32 provide a triple barrier against the entry of moisture and dust from the top, sides or bottom of the assembly. Moisture and dust somehow bypassing the first barrier are stopped by the second or third barrier. The top outer wall 20 overlaps the rearwardly curved upper edge 62 of the cover 12 and blocks entry of most of the moisture and dust between the top outer wall 20 and the cover 12. The top inner wall 28 slopes downwardly from the center of the housing 10, as described hereinabove, and directs moisture bypassing the upper edge 62 of the cover 12 outwardly toward the side outer walls 22, 23 and then downwardly and out of the assembly through the gap 26. Thus, a chamber, defined by the base 14 and the inner walls 28, 30, 31, 32, and enclosed by the cover 12, is protected against entry of moisture and dust.

Figures 5, 6:
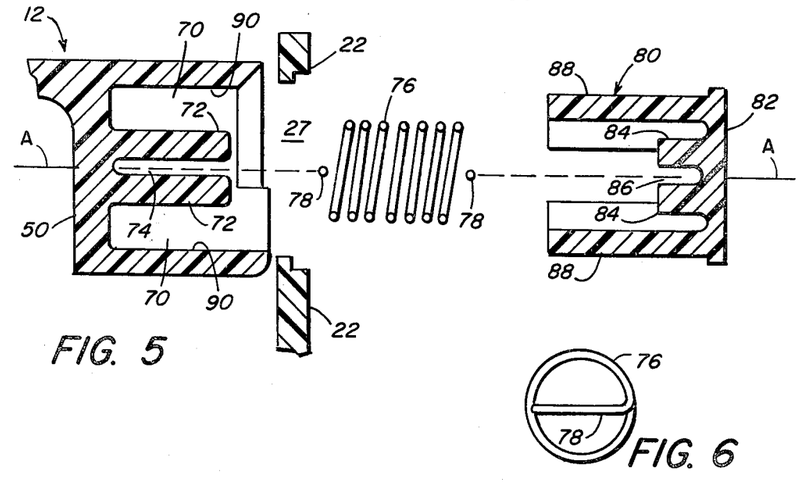
FIG. 5 is an exploded cross-sectional view of the hinge construction used in the weatherproof cover assembly of FIG. 1.
FIG. 6 is an end view of the torsion spring shown in FIG. 5.

The construction of the hinge between the cover 12 and the housing 10 is shown in exploded cross-sectional view in FIG. 5. The hinge portion 50 of the cover 12 includes a cylindrical opening 70. A post 72 having a slot 74 through its center projects from a closed end of the cylindrical opening 70. Both the cylindrical opening 70 and the post 72 are coaxially aligned with the axis of rotation A of the cover 12. A spiral wound cylindrical torsion spring 76 with end loops 78 on diameter thereof, as best shown in FIG. 6, is coaxially aligned with the axis of rotation A of the cover 12 and is positioned in the cylindrical opening 70 with the post 72 projecting into the spring 76 so that one of the end loops 78 of the spring 76 is secured in the slot 74. A pivot insert 80 includes a base portion 82 which is coupled to the side outer wall 22 of the housing 10 in the hole 27. The pivot insert 80 includes a post 84 which projects from the base portion 82 into the spring 76. The post 84 includes a slot 86 in which the other of the end loops 78 of the spring 76 is secured. The pivot insert 80 further includes one or more sleeve portions 88 which project from the base portion 82 into the cylindrical opening 70 between the spring 76 and an inner surface 90 of the cylindrical opening 70. The sleeve portions 88 as shown in FIG. 5 are arc shaped to mate with the cylindrical opening 70. Alternatively, a cylindrical sleeve portion can be utilized.

The hinge construction as shown in FIG. 5 is assembled by placing the cover 12 in position on the housing 10. The spring 76 is then inserted through the hole 27 into the cylindrical opening 70 over the post 72. The pivot insert 80 is partially inserted through the hole 27 into the cylindrical opening 70 so that the other end loop 78 of the spring 76 is engaged by the slot 86 in the post 84. The pivot insert is then rotated by about one half turn and securely attached to the side outer wall 22. The turning of the pivot insert 80 deforms the spring 76, thereby causing a pretensioning of the hinge which holds the cover 12 in the closed position. The pivot insert 80 can be attached to the side outer wall 22 by any convenient method, such as by cementing or by the use of snap tabs (not shown).

In operation, the hinge portion 50 of the cover 12 pivots about the sleeve portions 88 of the pivot insert 80 as the cover 12 is opened or closed. Furthermore, when the cover 12 is opened, the post 72 pivots relative to the post 84 and causes a further deformation of the spring 76. The force resulting from the deformation of the spring 76 urges the cover 12 back toward its closed position.

As noted hereinabove, a gap 26 exists between the bottom outer walls 24 and 25. The cover 12, when closed, extends over the region of the gap 26. The gap 26 facilitates opening of the cover 12 by providing an opening in the outer wall through which the cover 12 can be gripped.

The housing 10 includes a lug 36 having an opening 38 therethrough and the cover 12 includes a foot 64, as noted hereinabove. When the cover 12 is closed, the second portion 68 of the foot 64 is located rearwardly of at least a portion of the opening 38. A fastener element such as a padlock (not shown) can be positioned through the opening 38 to prevent the cover 12 from being opened by unauthorized persons.

Figure 7:
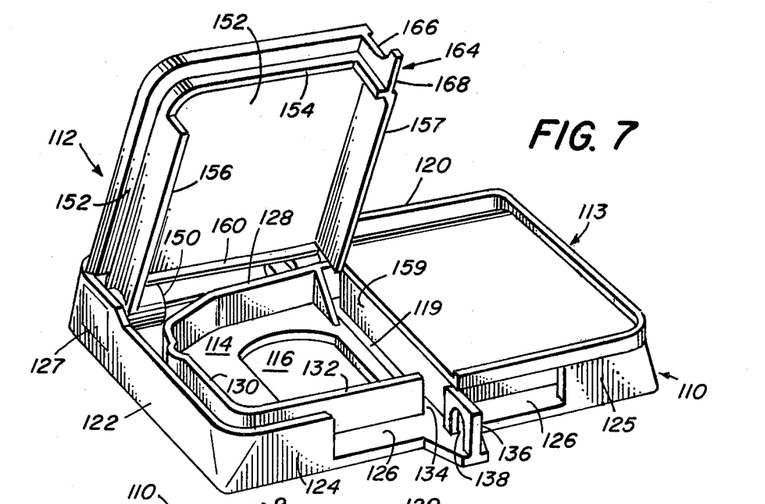
FIG. 7 is a perspective view of a two-cover weatherproof cover assembly according to the present invention.

Another example of a weatherproof cover assembly according to the present invention is shown in FIG. 7. The weatherproof cover assembly includes a housing 110 and a two-cover arrangement including a left cover 112 and a right cover 113. The covers 112, 113, which can be independently opened and closed, are pivotally attached to the housing 110 and to each other.

Figure 8:
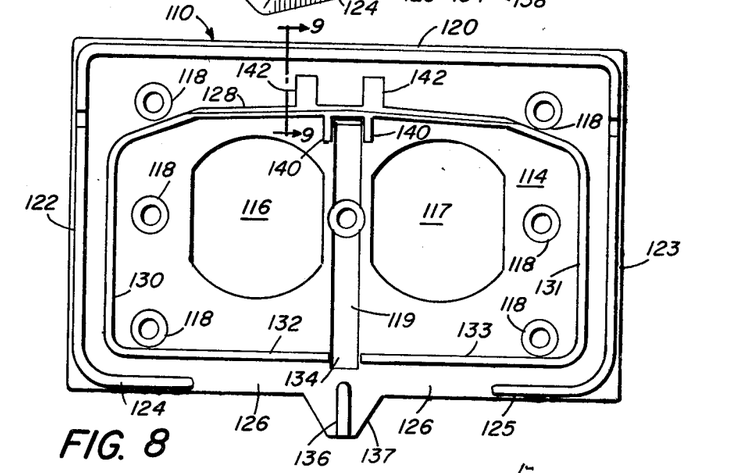
FIG. 8 is a front view of the housing of the weatherproof cover assembly shown in FIG. 7.
Figure 9:
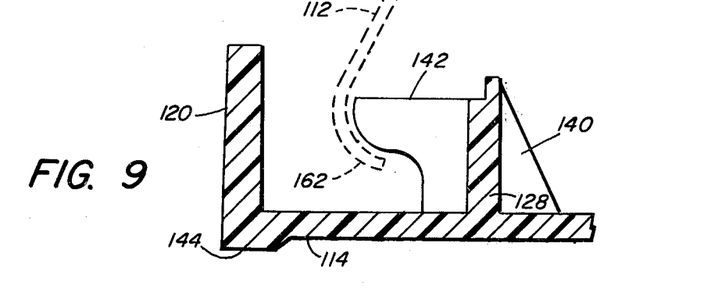
FIG. 9 is a partial cross-sectional view taken through the line 9—9 of the housing shown in FIG. 8.

The housing 110, which is shown in FIGS. 7, 8 and 9, includes a base 114, provided with mounting holes 118. The base 114 has apertures 116, 117 therethrough for access to the electrical wiring device. The apertures 116, 117 are intended for use with a duplex receptacle. The base 114 further includes a vertically oriented groove 119 between the apertures 116, 117, as best illustrated in FIG. 8. A top outer wall 120, opposing side outer walls 122, 123 and bottom outer walls 124, 125 extend frontwardly from the base 114. The outer walls 120, 122, 123, 124, 125 are interconnected to form a continuous outer wall around the base 114 except for a gap 126 between the bottom outer walls 124 and 125. Each of the side outer walls 122, 123 has a hole 127 for pivotal mounting of the covers 112, 113, respectively. The top outer wall 120 extends from the base 114 by a greater distance than the side outer walls 122, 123 and the bottom outer walls 124, 125 so as to overhang the upper edge of the covers 112, 113. A top inner wall 128, opposing side inner walls 130, 131 and bottom inner walls 132, 133 extend frontwardly from the base 114 and are interconnected to from a continuous inner wall except for a gap 134 between the bottom inner walls 132 and 133. The gap 134 provides for the escape of liquids entering the assembly between the covers 112 and 113. The apertures 116, 117 are located inside the inner walls 128, 130, 131, 132, 133. The top inner wall 128 is sloped downwardly from the center of the housing 110 toward the side outer walls 122, 123. A lug 136, which extends frontwardly from a downward projection 137 on the base 114 near the bottom thereof and has an opening 138 therethrough, is used for locking of the weatherproof cover assembly. The housing 110 also includes wall braces 140 located near the center of the top inner wall 128. The braces 140 strengthen the top inner wall 128 in the region where the covers 112, 113 are pivotally attached to each other. The housing 110 further includes cover retainers 142 projecting upwardly from the top inner wall 128 near the center thereof. The purpose of the cover retainers 142 is described hereinafter. The base 114 includes a raised rear edge 144 around the periphery thereof, as shown in FIG. 9. The raised rear edge 144 provides improved sealing of the cover assembly to the wall by concentrating pressure on the gasket material in a relatively small area.

Figure 10:
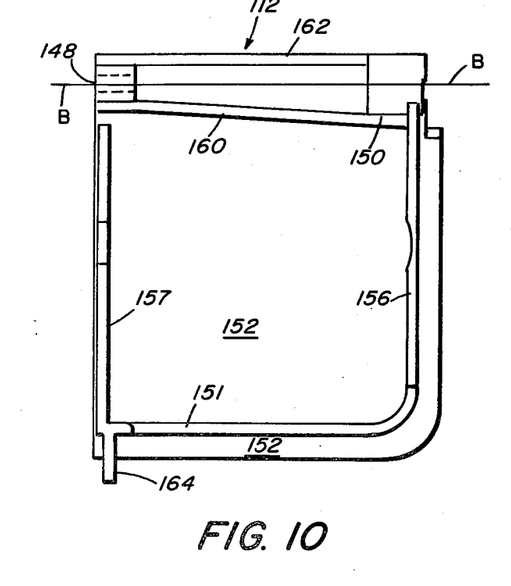
FIG. 10 is a rear view of the left cover of the weatherproof cover assembly shown in FIG. 7.
Figure 11:
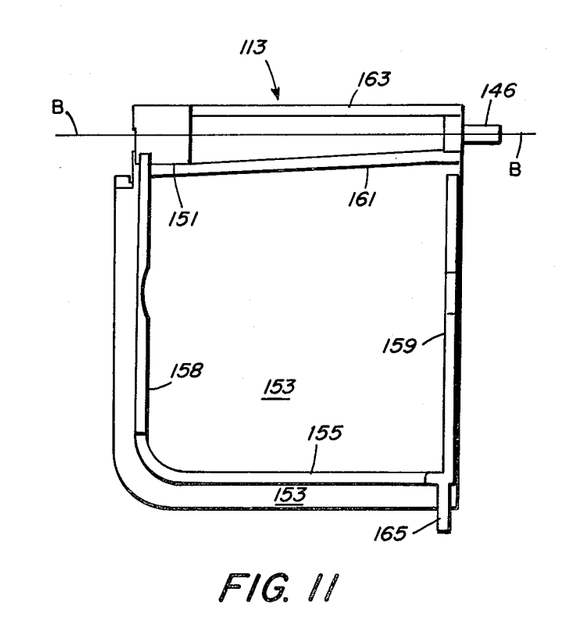
FIG. 11 is a rear view of the right cover of the weatherproof cover assembly shown in FIG. 7.

The left cover 112 and the right cover 113, which are shown in FIGS. 7, 10 and 11, together cover the base 114. The left cover 112, when closed, covers the side outer wall 122, the bottom outer wall 124 and the aperture 116. The right cover 113, when closed, covers the side outer wall 123, the bottom outer wall 125 and the aperture 117. The covers 112, 113 are mounted below the top outer wall 120. The right cover 113 includes a pivot pin 146; the left cover 112 includes a mating aperture 148 for receiving the pin 146. The pivot pin 146 and the mating aperture 148 provide pivotal attachment between the covers 112, 113. The covers 112, 113 further include hinge portions 150, 151, respectively, which are pivotally attached to the side outer walls 122, 123, respectively. The covers 112, 113 pivot about an axis of rotation B through the hinge portions 150, 151, the pivot pin 146, and the mating aperture 148, as shown in FIGS. 10 and 11. The covers 112, 113 have generally flat rear surfaces 152, 153, respectively. Flanges 154, 156, 160 extend rearwardly from the rear surface 152 of the cover 112 and are interconnected. An interior wall 157 extends rearwardly from an interior edge of the left cover 112. When the cover 112 is closed, the flanges 154, 156, 160 are located between the outer walls 120, 122, 124 and the inner walls 128, 130, 132 of the housing 110. Furthermore, when the cover 112 is closed, the rear surface 152 of the cover 112 bears against the front surfaces of the side outer wall 122 and the bottom outer wall 124 and against the front surfaces of the inner walls 128, 130, 132 and the interior wall 157 bears against the bottom of the groove 119. Flanges 155, 158, 161 extend rearwardly from the rear surface 153 of the cover 113 and are interconnected. An interior wall 159 extends rearwardly from an interior edge of the cover 113. When the cover 113 is closed, the flanges 155, 158, 161 are located between the outer walls 120, 123, 125 and the inner walls 128, 131, 133 of the housing 110. Furthermore, when the cover 113 is closed, the rear surface 153 of the cover 113 bears against the front surfaces of the side outer wall 123 and the bottom outer wall 125 and against the front surfaces of the inner walls 128, 131, 133 and the interior wall 159 bears against the bottom of the groove 119. The upper edge 162 of the cover 112 and the upper edge 163 of the cover 113 are curved rearwardly. The covers 112, 113 further include feet 164, 165, respectively, used to lock the respective covers in a closed position. The foot 164 includes a first portion 166 extending rearwardly from the cover 112 near the lower edge of the cover 112, and a second portion 168 extending downwardly from the first portion 166. The foot 165 has a similar construction.

The covers 112, 113, the outer walls 120, 122, 123, 124, 125, the inner walls 128, 130, 131, 132, 133, and the flanges 154, 155, 156, 158, 160, 161 inhibit the entry of moisture and dust into the assembly as described hereinabove in connection with the weatherproof cover assembly shown in FIG. 1. Furthermore, the groove 119 in the base 114 and the interior walls 157, 159 of the covers 112, 113, respectively, inhibit the entry of moisture and dust between the covers 112, 113. When the cover 112 is closed, a left region of the assembly defined by the base 114 and the inner walls 128, 130, 132 is enclosed by the cover 112 and the associated interior wall 157. Similarly, when the cover 113 is closed, a right region of the assembly defined by the base 114 and the inner walls 128, 131, 133 is enclosed by the cover 113 and the associated interior wall 159. Moisture entering between the interior walls 157, 159 flows down the groove 119 and out of the assembly and the left and right regions of the assembly are protected.

The pivotal attachments between the covers 112, 113 and the side outer walls 122, 123, respectively, are the same as that shown in FIGS. 5 and 6 and described hereinabove. In addition, the pivot pin 146 on the cover 113 and the mating aperture 148 on the cover 112 provide pivotal attachment between the covers 112, 113. Thus, either of the covers can be opened or closed independently of the other. The cover retainers 142 hold the covers 112, 113 in place when they are opened. Referring now to FIG. 9, the cover 112 is shown in dashed form in relation to the cover retainer 142. When the cover 112 is opened, the rearwardly curved upper edge 162 of the cover 112 pivots underneath an overhanging portion of the cover retainer 142. Thus, the cover retainer 142 prevents the cover 112 from being inadvertently pulled out of the assembly.

The feet 164, 165 on the covers 112, 113, respectively, in conjunction with the lug 136 on the base 114, provide for locking of the weatherproof cover assembly. As described hereinabove in connection with FIG. 1, a fastener element such as a padlock (not shown) can be positioned through the opening 138 in the lug 136 to prevent the covers 112, 113 from being opened by unauthorized persons.

Figure 12:
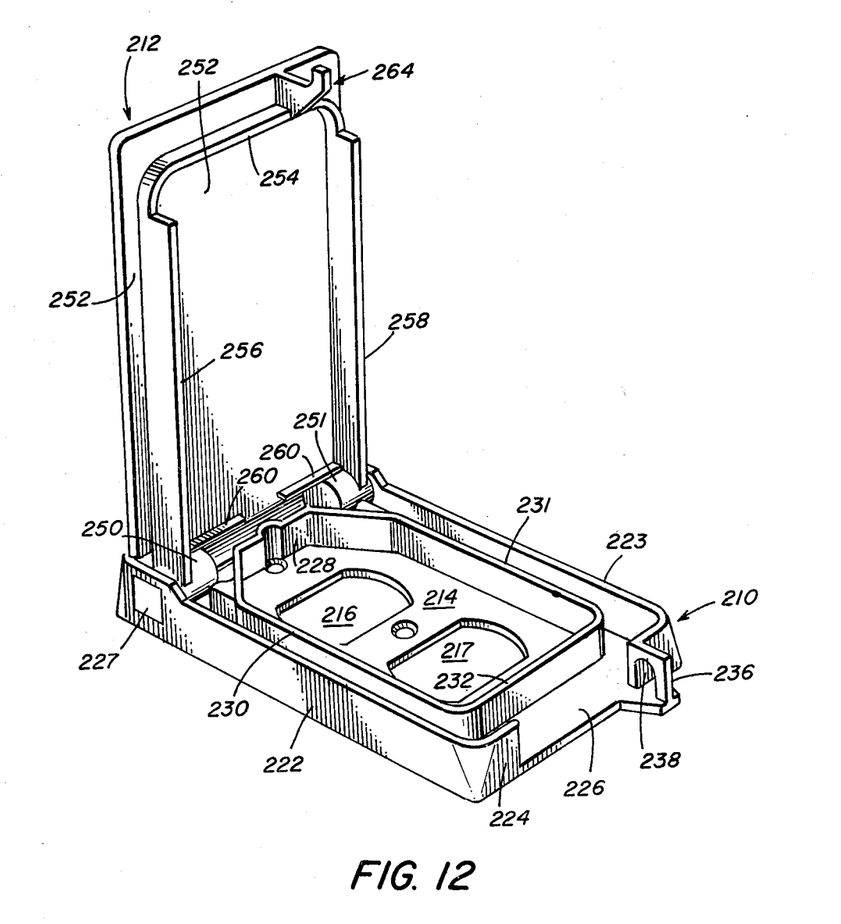
FIG. 12 is a perspective view of a single cover, vertical weatherproof cover assembly according to the present invention.

Another example of a weatherproof cover assembly according to the present invention is shown in FIG. 12. The weatherproof cover assembly includes a housing 210 and a cover 212 pivotally attached to the housing 210. The cover assembly shown in FIG. 12 is similar in most respects to the cover assembly shown in FIG. 1 except that it is intended for vertical mounting rather than horizontal mounting and is proportioned accordingly.

Figure 13:
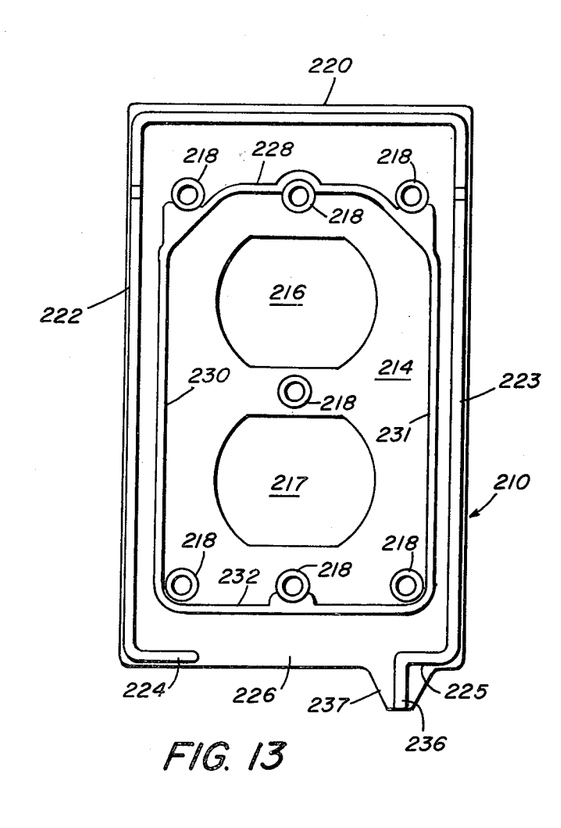
FIG. 13 is a front view of the housing of the weatherproof cover assembly shown in FIG. 12.

The housing 210, which is shown in FIGS. 12 and 13, includes a base 214, provided with mounting holes 218. The base 214 has apertures 216 and 217 therethrough for access to the electrical wiring device. A top outer wall 220, opposing side outer walls 222, 223 and bottom outer walls 224, 225 extend frontwardly from the base 214. The outer walls 220, 222, 223, 224, 225 are interconnected to form a continuous outer wall around the base 214 except for a gap 226 between the bottom outer walls 224 and 225. Each side outer wall 222, 223 has a hole 227 for pivotal mounting of the cover 212. A top inner wall 228, opposing side inner walls 230, 231 and a bottom inner wall 232 extend frontwardly from the base 214 and are interconnected to form a continuous inner wall. The apertures 216, 217 are located inside the inner walls 228, 230, 231, 232. A lug 236, which extends frontwardly from a downward projection 237 on the base 214 near the bottom of the base 214 and has an opening 238 therethrough, is used for locking of the weatherproof cover assembly.

Figure 14:
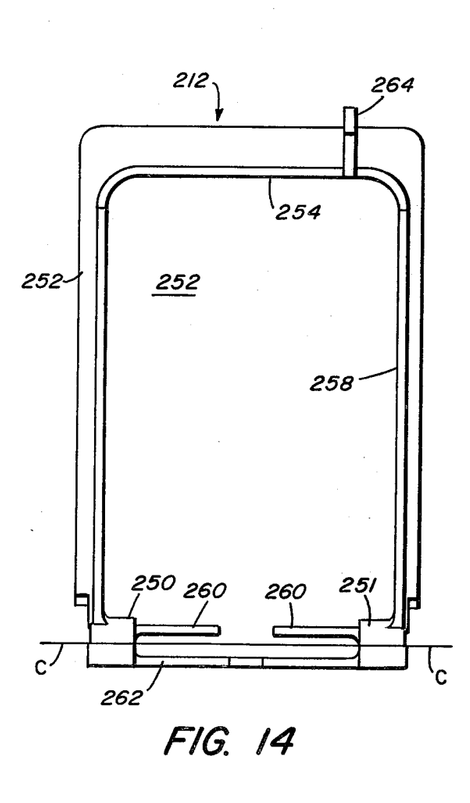
FIG. 14 is a rear view of the cover of the weatherproof cover assembly shown in FIG. 12.

The cover 212, which is shown in FIGS. 12 and 14, includes hinge portions 250, 251 which are pivotally attached to the side outer walls 222, 223, respectively. The cover 212 pivots about an axis of rotation C through the hinge portions 250, 251 as shown in FIG. 14. The cover 212 has a generally flat rear surface 252. Flanges 254, 256, 258, 260, which extend rearwardly from the rear surface 252, are interconnected. When the cover 212 is closed, the flanges 254, 256, 258, 260 are located between the outer walls 220, 222, 223, 224, 225 and the inner walls 228, 230, 231, 232 of the housing 210. Also, when the cover 212 is closed, the rear surface 252 of the cover 212 bears against the front surfaces of the side outer walls 222, 223 and the bottom outer walls 224, 225 and against the front surfaces of the inner walls 228, 230, 231, 232. The upper edge 262 of the cover 212 is curved rearwardly. The cover 212 further includes a foot 264 used to lock the cover 212 in the closed position.

The construction of the hinge between the cover 212 and the housing 210 is the same that as shown in FIGS. 5 and 6 and described hereinabove. Furthermore, the cover, the inner and the outer walls on the housing and the flanges on the cover together inhibit entry of liquids into the assembly when the cover is closed as described hereinabove in connection with FIG. 1.

While various methods can be used to fabricate the weatherproof cover assemblies described hereinabove, it is preferred that the housings 10, 110, 210, the covers 12, 112, 113, 212 and the pivot insert 80 be fabricated as molded parts using a polycarbonate material.

Thus, there is provided by the present invention a weatherproof cover assembly which has few parts, which has a novel hinge construction and which is inexpensive to manufacture. Furthermore, the weatherproof cover assembly disclosed herein passes a commonly used test for such assemblies. Water is directed on the assembly from above at an angle of 45° in simulation of rain and from below at an angle of 45° in simulation of a lawn sprinkler. Moisture does not accumulate on the electrical wiring device during the test.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A weatherproof cover assembly for an electrical wiring device comprising:
   a housing including
      a base having at least one aperture therethrough for access to said wiring device,
      a plurality of interconnected outer walls extending frontwardly from said base and including a top outer wall and opposing side outer walls, each of said side outer walls having a front surface,
      a plurality of interconnected inner walls, extending frontwardly from said base, each having a front surface, said inner walls and said base defining a chamber;

cover means pivotally attached to said side outer walls for enclosing said chamber when said cover means is closed and for providing access to said wiring device when cover means is open, said cover means including a plurality of interconnected flanges extending rearwardly from said cover means, said flanges being disposed between said inner and outer walls when said cover is closed; and means for pivotally attaching said cover means to said side outer walls, so that said cover means pivots about an axis of rotation, whereby, when said cover means is closed, said outer walls, said inner walls, said flanges, and said cover means together inhibit entry of moisture and dust into said chamber.

2. The weatherproof cover assembly as defined in claim 1 wherein said cover means includes a single piece cover pivotally attached near an upper edge thereof to said side outer walls near the top thereof, whereby said cover pivots upwardly from a closed position about said axis of rotation.

3. The weatherproof cover assembly as defined in claim 2 further including means for locking said cover in a closed position.

4. The weatherproof cover assembly as defined in claim 3 wherein said means for locking includes a foot having a first portion extending rearwardly from said cover near a lower edge thereof and a second portion extending downwardly from said first portion, and a lug extending frontwardly from said base and having an opening therethrough, said lug being located on said base so that when said cover is closed, said second portion of said foot is located rearwardly of a portion of the opening in said lug, whereby, when a fastener is positioned through the opening in said lug, said cover is prevented by the fastener from being opened.

5. The weatherproof cover assembly as defined in claim 3 wherein said top outer wall extends frontwardly of the upper edge of said cover, thereby inhibiting entry of moisture and dust into said chamber from above.

6. The weatherproof cover assembly as defined in claim 5 wherein said plurality of inner walls includes a top inner wall which is sloped downwardly from the center of said housing toward said side outer walls, whereby moisture present on said top inner wall is directed away from said chamber.

7. The weatherproof cover assembly as defined in claim 1 wherein said cover means includes a left cover pivotally attached near an upper edge thereof to one of said side outer walls near the top thereof and a right cover pivotally attached near an upper edge thereof to the other of said side outer walls near the top thereof, said left and right covers having interior edges pivotally attached to each other so that said left and right covers can be independently pivoted upwardly from a closed position about said axis of rotation.

8. The weatherproof cover assembly as defined in claim 7 wherein said at least one aperture through said base includes a first aperture which is covered by said left cover and a second aperture which is covered by said right cover.

9. The weatherproof cover assembly as defined in claim 8 wherein said base includes a vertically oriented groove between said first aperture and said second aperture, said left cover includes an interior wall extending rearwardly from said interior edge of said left cover and bearing against a bottom surface of said groove when said left cover is closed, and said right cover includes an interior wall extending rearwardly from said interior edge of said right cover and bearing against the bottom surface of said groove when said right cover is closed, whereby said interior walls inhibit entry of moisture and dust between said left and right covers into said assembly.

10. The weatherproof cover assembly as defined in claim 7 wherein one of said covers includes a cylindrical projection on said axis of rotation and the other of said covers includes a mating aperture for receiving said cylindrical projection, said cylindrical projection and said mating aperture providing pivotal attachment between said left and right covers.

11. The weatherproof cover assembly as defined in claim 10 further including means for locking said covers in the closed position.

12. The weatherproof cover assembly as defined in claim 11 wherein said means for locking includes a foot on each of said left and right covers, said foot having a first portion extending rearwardly from the respective cover near the lower edge thereof and a second portion extending downwardly from said first portion, and a lug extending frontwardly from said base and having an opening therethrough, said lug being located on said base so that when said left and right covers are closed, said second portion of said foot on each of said left and right covers is located rearwardly of a portion of the opening in said lug, whereby, when a fastener is positioned through the opening in said lug, said left and right covers are prevented by the fastener from being opened.

13. The weatherproof cover assembly as defined in claim 11 wherein said top outer wall extends frontwardly of the upper edge of said left and right covers, thereby inhibiting entry of moisture and dust into said chamber from above.

14. The weatherproof cover assembly as defined in claim 13 wherein said plurality of inner walls includes a top inner wall which is sloped downwardly from the center of said housing towards said side outer walls, whereby moisture present on said top inner wall is directed away from said chamber.

15. The weatherproof cover assembly as defined in claim 1 wherein said means for pivotally attaching said cover means to said side outer walls includes a hinge portion of said cover means near an upper edge of said cover means, said hinge portion including a cylindrical opening having a closed end and a first post which projects from the closed end of said opening and which has a slot therein, said cylindrical opening and said first post being coaxially aligned with said axis of rotation, a cylindrical torsion spring and end loops on a diameter thereof, coaxially aligned with said axis of rotation and positioned in said cylindrical opening with said first post projecting into said spring so that one of the end loops of said spring is secured in said slot and a pivot insert including a base portion coupled to one of said side outer walls, a second post which projects from said base portion into said spring and which has a slot in which the other of the end loops of said spring is secured, and at least one sleeve portion which projects from said base portion into said cylindrical opening between said spring and an inner surface of said cylindrical opening, whereby said cover means pivots about said sleeve portion and said spring urges said cover means to a closed position.

16. A spring loaded hinge construction for attachment of a cover to a housing so that the cover pivots about an axis of rotation, said hinge construction comprising:

a hinge portion of the cover including a cylindrical opening having a closed end and a first post which projects from the closed end of said opening and which has a slot therein, said cylindrical opening and said first post being coaxially aligned with said axis of rotation;

a cylindrical torsion spring with end loops on a diameter thereof, coaxially aligned with said axis of rotation and positioned in said cylindrical opening with said first post projecting into said spring so that one of the end loops of said spring is secured in said slot in said first post; and a pivot insert including a base portion coupled to said housing, a second post which projects from said base portion into said spring and which has a slot in which the other of the end loops of said spring is secured, and at least one sleeve portion which projects from said base portion into said cylindrical opening between said spring and an inner surface of said cylindrical opening, whereby said cover pivots about said sleeve portion and said spring urges said cover to a closed position.

17. A weatherproof cover assembly for an electrical wiring device comprising:

a housing including
 a base having at least one aperture therethrough for access to said wiring device,
 a plurality of interconnected outer walls extending frontwardly from said base and including a top outer wall and opposing side outer walls, each of said side outer walls having a front surface,
 an inner wall extending frontwardly from said base and surrounding said at least one aperture;

a cover pivotally attached to said outer walls for enclosing said assembly when said cover is closed and for providing access to said wiring device when said cover is open, said cover including
 a flange extending rearwardly from said cover, said flange being disposed between said inner wall and said outer walls so as to surround said inner wall when said cover is closed; and means for pivotally attaching said cover to said outer walls, whereby, when said cover is closed, said outer walls, said inner wall, said flange, and said cover together inhibit entry of moisture and dust into said assembly.

18. The weatherproof cover assembly as defined in claim 17 wherein said plurality of outer walls includes a bottom outer wall having a gap therein which provides access to a lower edge of said cover to facilitate opening thereof.

19. The weatherproof cover assembly as defined in claim 18 wherein each of said housing and said cover has a unitary molded construction.

20. A weatherproof cover assembly for an electrical wiring device comprising:

a housing including
 a base having at least two apertures therethrough for access to said wiring device,
 a plurality of interconnected outer walls extending frontwardly from said base and including a top outer wall and opposing side outer walls, each of said side outer walls having a front surface,
 a plurality of interconnected inner walls, extending frontwardly from said base, each of said inner walls having a front surface;

two covers pivotally attached to said outer walls and pivotally attached to each other, so that each cover can be independently opened and closed, said covers each including
 a plurality of interconnected flanges extending rearwardly from said cover, said flanges being disposed between said inner and outer walls when said cover is closed, and
 an interior wall extending rearwardly from an interior edge of said cover and bearing against said base when said cover is closed; and means for pivotally attaching said covers to said outer walls, whereby, when said covers are closed, said outer walls, said inner walls, said flanges, said interior walls and said covers together inhibit entry of moisture and dust into said assembly.

21. The weatherproof cover assembly as defined in claim 20 wherein one of said covers includes a cylindrical projection on said axis of rotation and the other of said covers includes a mating aperture for receiving said cylindrical projection, said cylindrical projection and said mating aperture providing pivotal attachment between said covers.

22. The weatherproof cover assembly as defined in claim 21 wherein said plurality of outer walls includes a bottom outer wall having a gap therein which provides access to a lower edge of said cover to facilitate opening thereof.

23. The weatherproof cover assembly as defined in claim 22 wherein each of said housing and said covers has a unitary molded construction.

24. The weatherproof cover assembly of any one of claims 1–14, or 15 inclusive, wherein said cover includes a rear surface which bears against a front surface of said inner wall and against said front surfaces of said outer walls when said cover is closed.

25. The weatherproof cover assembly of claims 17, 18, or 19 wherein said cover includes a rear surface which bears against a front surface of said inner wall and against said front surfaces of said outer walls when said cover is closed.

26. The weatherproof cover assembly of claims 20, 21, 22, or 23 wherein said cover includes a rear surface which bears against a front surface of said inner wall and against said front surfaces of said outer walls when said cover is closed.

* * * * *